US012657871B2

(12) United States Patent     (10) Patent No.:     US 12,657,871 B2
Makita et al.                    (45) Date of Patent:      Jun. 16, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Koji Makita, Kanagawa (JP); Akifumi Tanaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 362 days.

(21) Appl. No.: 18/295,352

(22) Filed: Apr. 4, 2023

(65)          Prior Publication Data

US 2023/0326181 A1      Oct. 12, 2023

(30)          Foreign Application Priority Data

Apr. 8, 2022     (JP) ................................. 2022-064646

(51) Int. Cl.
| | |
|---|---|
| *G06V 10/764* | (2022.01) |
| *G06V 10/74* | (2022.01) |
| *G06V 10/776* | (2022.01) |
| *G06V 10/94* | (2022.01) |
| *G06V 40/16* | (2022.01) |

(52) U.S. Cl.
CPC .......... *G06V 10/764* (2022.01); *G06V 10/761* (2022.01); *G06V 10/776* (2022.01); *G06V 10/945* (2022.01); *G06V 40/172* (2022.01)

(58) Field of Classification Search
CPC .................................................... G06V 10/764
See application file for complete search history.

(56)          References Cited

U.S. PATENT DOCUMENTS

| | | | |
|---|---|---|---|
| 10,909,166 B1* | 2/2021 | Bogazzi .............. | G06F 16/5838 |
| 2015/0125049 A1* | 5/2015 | Taigman .............. | G06N 3/0464 |
| | | | 382/118 |
| 2020/0151860 A1* | 5/2020 | Safdarnejad ......... | G06V 40/175 |

(Continued)

FOREIGN PATENT DOCUMENTS

| | | |
|---|---|---|
| JP | 2019-067194 A | 4/2019 |
| JP | 2022150552 A | 10/2022 |

OTHER PUBLICATIONS

Aslam et al., "The Star Clustering Algorithm for Static and Dynamic Information Organization", Journal of Graph Algorithms and Applications (2004) vol. 8, No. 1, pp. 95-129 URL: https://citeseerx.ist. psu.edu/viewdoc/download?doi=10.1.1.89.272&rep=rep1&type= pdp.

(Continued)

*Primary Examiner* — Oneal R Mistry
(74) *Attorney, Agent, or Firm* — Cowan, Liebowitz & Latman, P.C.

(57)          ABSTRACT

There is provided with an image processing apparatus for performing class classification of an image. A generation unit generates, for each class, a feature of an image group belonging to the class based on classification information for classifying each of a plurality of images to one of a plurality of classes in accordance with an object contained in an image. A determination unit determines, using the feature of each class, a possibility that the image group belonging to the class includes an image containing another object different from the object corresponding to the class.

20 Claims, 12 Drawing Sheets

(56)           References Cited

U.S. PATENT DOCUMENTS

| | | | | |
|---|---|---|---|---|
| 2020/0342214 | A1* | 10/2020 | Li | G06F 18/2413 |
| 2020/0394557 | A1* | 12/2020 | Boult | G06N 20/00 |
| 2021/0097344 | A1* | 4/2021 | Goldstein | G06V 30/2504 |
| 2021/0272253 | A1 | 9/2021 | Lin et al. | |
| 2022/0076039 | A1* | 3/2022 | Li | G06F 18/253 |
| 2022/0083636 | A1* | 3/2022 | Sarkis | G06F 21/32 |
| 2022/0138483 | A1* | 5/2022 | Zhang | G06N 20/00 |
| | | | | 382/176 |
| 2022/0147767 | A1* | 5/2022 | Yu | G06V 10/82 |

OTHER PUBLICATIONS

He et al., "Deep Residual Learning for Image Recognition", in arXiv (2015) 12 pgs (1-10) URL: https://arxiv.org/abs/1512.03385.
Deng et al., "ArcFace: Additive Angular Margin Loss for Deep Face Recognition" (2018) 10 pgs (4690-4699) URL: https://arxiv.org/abs/1801.07698.

\* cited by examiner

400

Similarity = cos θ

F I G. 7
| CLASS NUMBERS | IMAGE | M | NOISE CANDIDATE? |
|---|---|---|---|
| $C_0$ | | −0.5 | YES |
| $C_1$ | | +0.2 | NO |
| ⋮ | ⋮ | ⋮ | ⋮ |
| $C_{n-1}$ | | +0.1 | NO |
F I G. 8
800
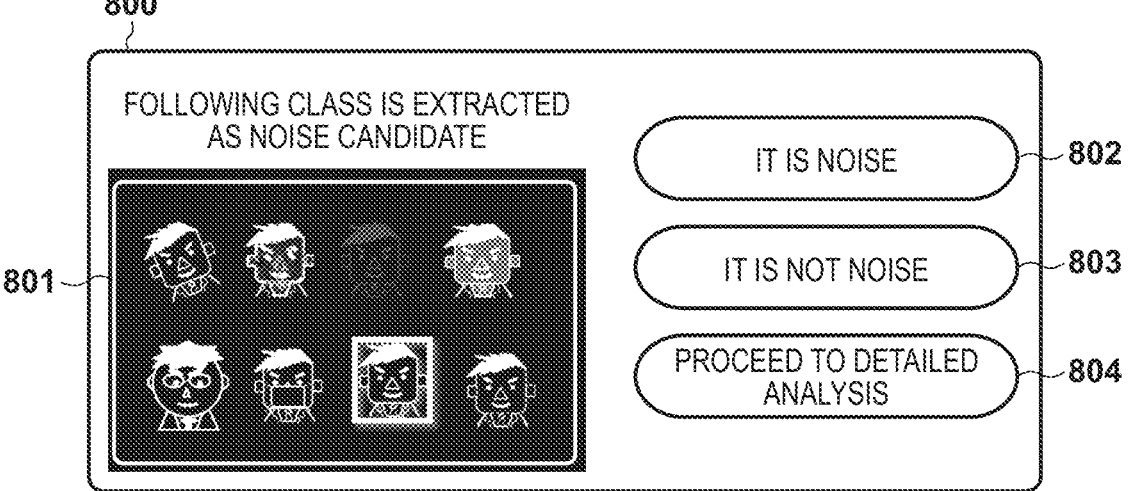
FOLLOWING CLASS IS EXTRACTED AS NOISE CANDIDATE
801
IT IS NOISE — 802
IT IS NOT NOISE — 803
PROCEED TO DETAILED ANALYSIS — 804

F I G. 9

F I G. 11
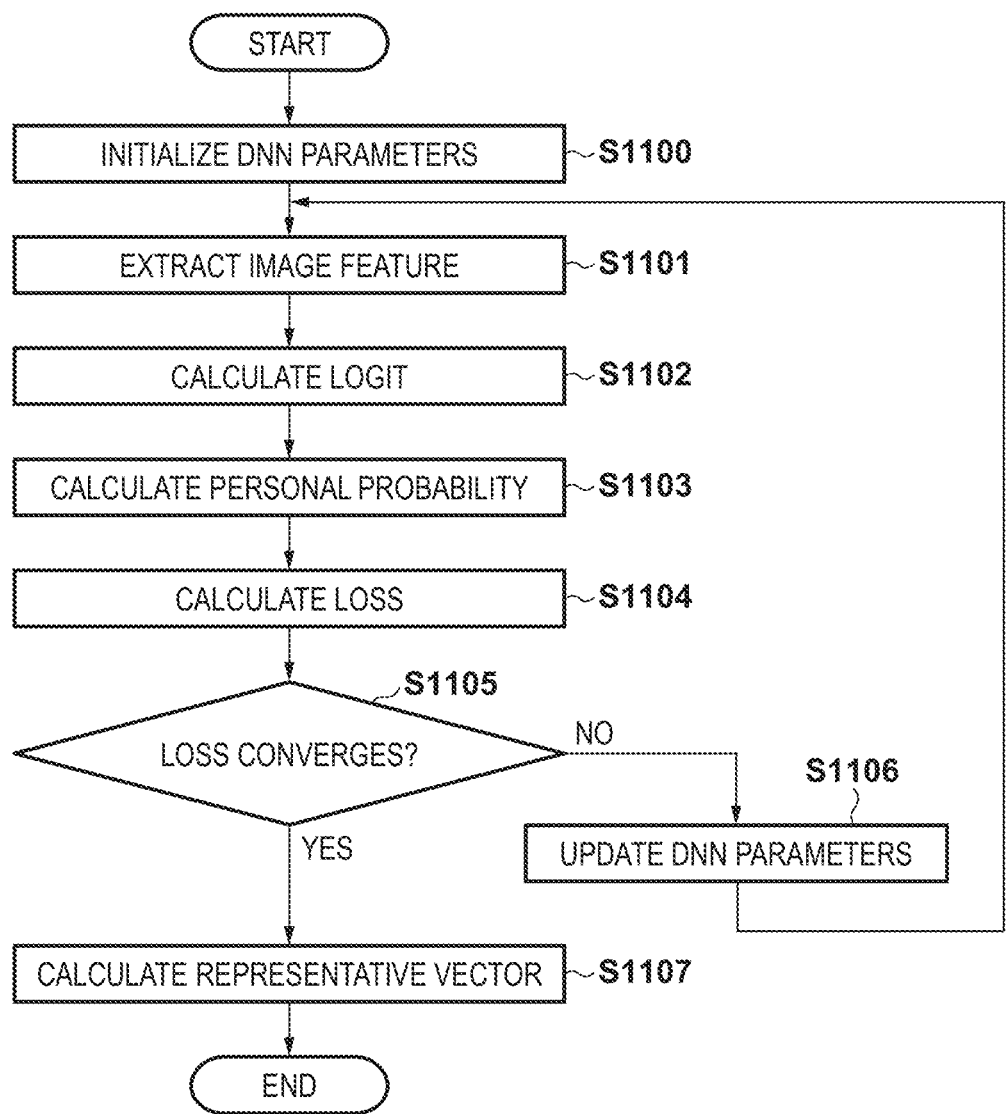

F I G. 12

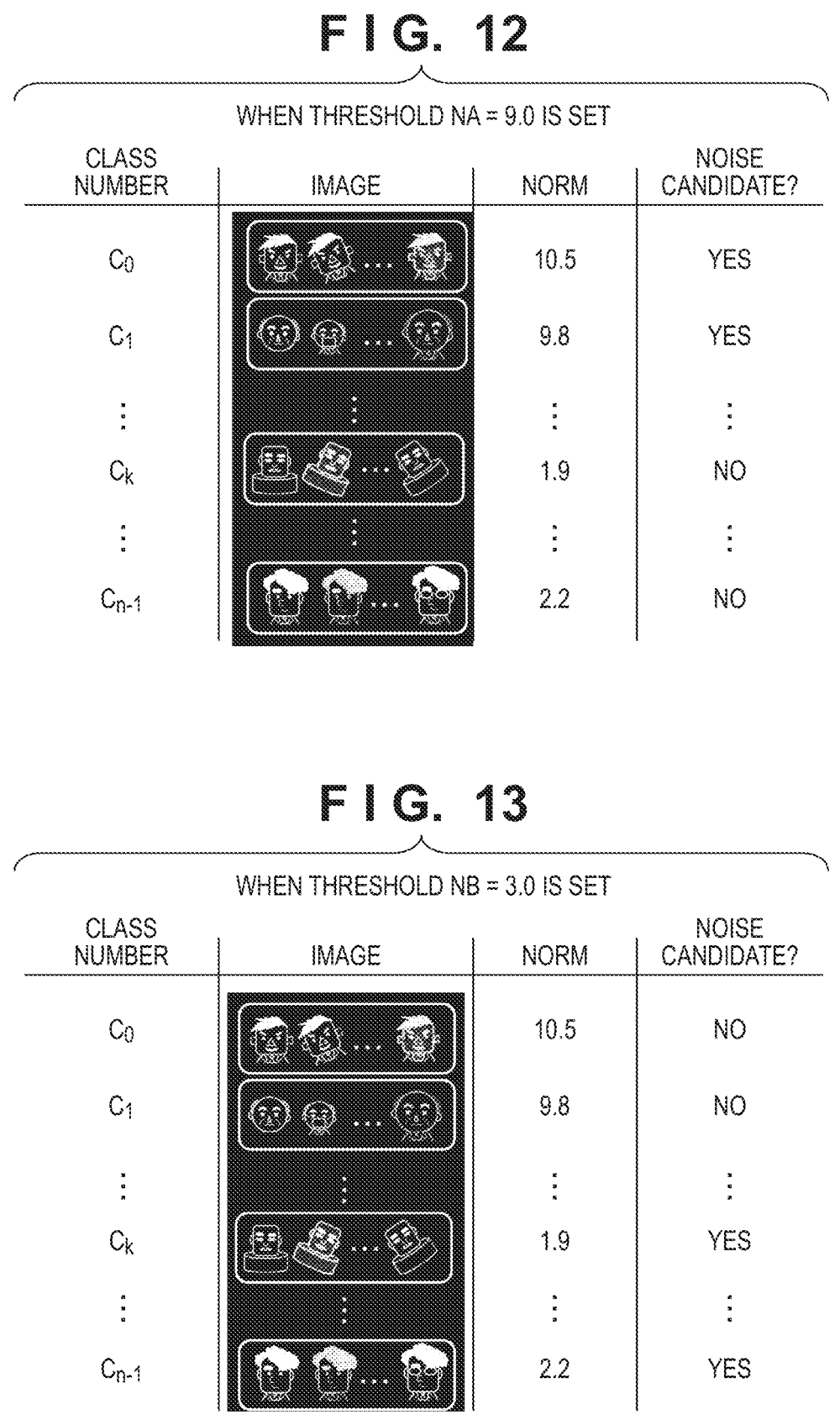

WHEN THRESHOLD NA = 9.0 IS SET

| CLASS NUMBER | IMAGE | NORM | NOISE CANDIDATE? |
|---|---|---|---|
| $C_0$ | | 10.5 | YES |
| $C_1$ | | 9.8 | YES |
| ⋮ | ⋮ | ⋮ | ⋮ |
| $C_k$ | | 1.9 | NO |
| ⋮ | ⋮ | ⋮ | ⋮ |
| $C_{n-1}$ | | 2.2 | NO |

F I G. 13

WHEN THRESHOLD NB = 3.0 IS SET

| CLASS NUMBER | IMAGE | NORM | NOISE CANDIDATE? |
|---|---|---|---|
| $C_0$ | | 10.5 | NO |
| $C_1$ | | 9.8 | NO |
| ⋮ | ⋮ | ⋮ | ⋮ |
| $C_k$ | | 1.9 | YES |
| ⋮ | ⋮ | ⋮ | ⋮ |
| $C_{n-1}$ | | 2.2 | YES |

WHEN THRESHOLD SC = 0.7 IS SET

| PAIR OF CLASS NUMBERS | IMAGE | SIMILARITY | NOISE CANDIDATE? |
|---|---|---|---|
| $(C_0, C_1)$ | | −0.8 | NO |
| ⋮ | ⋮ | ⋮ | ⋮ |
| $(C_{m-2}, C_{m-1})$ | | 0.8 | YES |
| ⋮ | ⋮ | ⋮ | ⋮ |
| $(C_{n-2}, C_{n-1})$ | | −0.6 | NO |

1500

FOLLOWING CLASS IS EXTRACTED AS NOISE CANDIDATE

1501

1502 — IT IS NOISE

1503 — IT IS NOT NOISE

F I G. 16
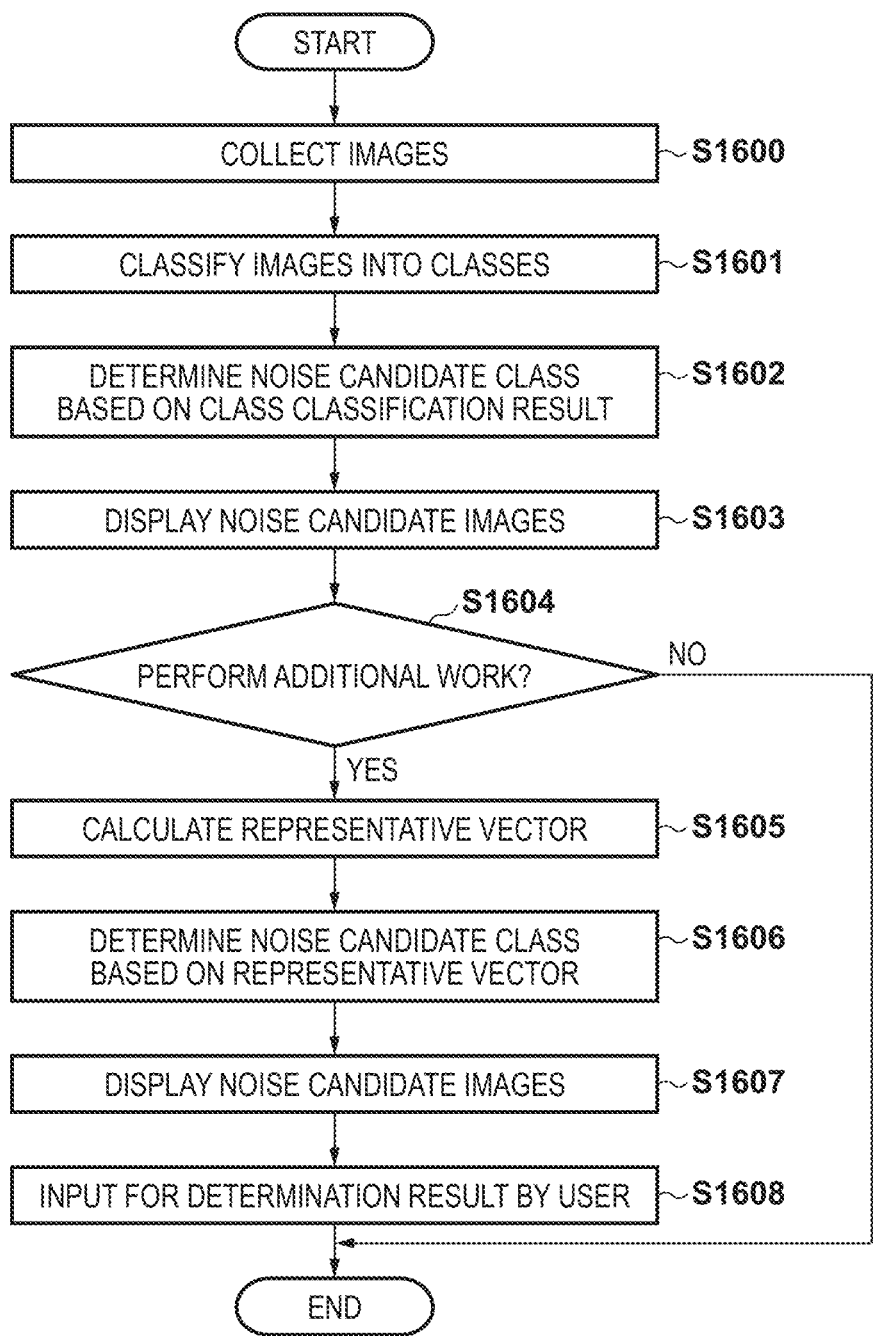

F I G. 17
1700
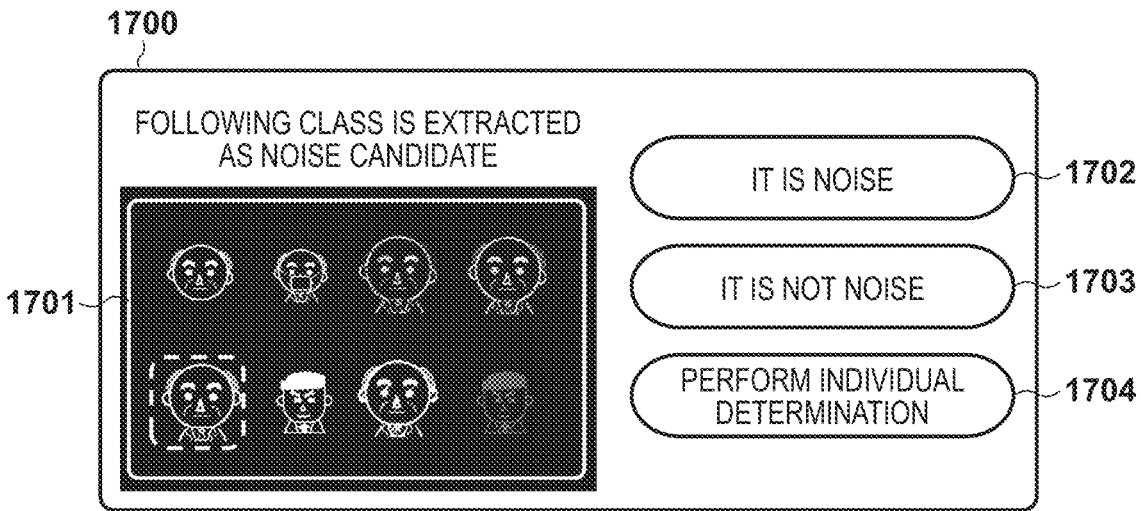
FOLLOWING CLASS IS EXTRACTED
AS NOISE CANDIDATE
1701
IT IS NOISE — 1702
IT IS NOT NOISE — 1703
PERFORM INDIVIDUAL
DETERMINATION — 1704
F I G. 18
1800
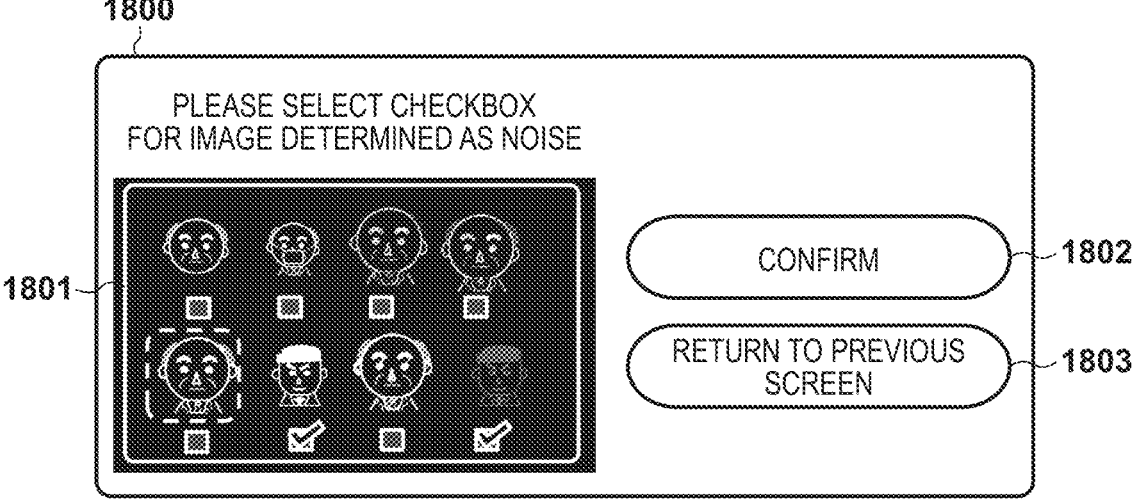
PLEASE SELECT CHECKBOX
FOR IMAGE DETERMINED AS NOISE
1801
CONFIRM — 1802
RETURN TO PREVIOUS
SCREEN — 1803

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

Conventionally, to acquire a learning image of a machine learning model, an enormous number of images containing a desired person and the like are classified into desired classes. From the viewpoint of restrictions on time and labor, a user does not perform visual check to closely examine the large number of images belonging to each class classified by an image processing apparatus. For this reason, an image that does not contain the desired person may be included in the class including images with the desired person.

Considering the above-described problem, there is proposed a method of collecting an enormous number of images corresponding to a keyword of an object and an enormous number of images corresponding to an associated word group associated with the keyword of the object, classifying these images into classes, and selecting a desired class from the classes (Japanese Patent Laid-Open No. 2019-67194).

SUMMARY OF THE INVENTION

The present invention in its one aspect provides an image processing apparatus for performing class classification of an image, comprising at least one processor, and a memory coupled to the at least one processor, the memory storing instructions that, when executed by the processor, cause the processor to act as a generation unit configured to generate, for each class, a feature of an image group belonging to the class based on classification information for classifying each of a plurality of images to one of a plurality of classes in accordance with an object contained in an image, and a determination unit configured to determine, using the feature of each class, a possibility that the image group belonging to the class includes an image containing another object different from the object corresponding to the class.

The present invention in its one aspect provides an image processing method comprising generating, for each class, a feature of an image group belonging to the class based on classification information for classifying each of a plurality of images to one of a plurality of classes in accordance with an object contained in an image, and determining, using the feature of each class, a possibility that the image group belonging to the class includes an image containing another object different from the object corresponding to the class.

The present invention in its one aspect provides a non-transitory computer-readable storage medium storing instructions that, when executed by a computer, cause the computer to perform an image processing method comprising generating, for each class, a feature of an image group belonging to the class based on classification information for classifying each of a plurality of images to one of a plurality of classes in accordance with an object contained in an image, and determining, using the feature of each class, a possibility that the image group belonging to the class includes an image containing another object different from the object corresponding to the class.

Further features of the present invention will become apparent from the following description of exemplary embodiments (with reference to the attached drawings).

BRIEF DESCRIPTION OF THE DRAWINGS

FIG. 7 is a view showing the determination result of each class according to the first embodiment;

FIG. 8 is a view showing an example of a screen that displays an image group of a class number $C_0$ according to the first embodiment;

FIG. 9 is a block diagram showing an example of the functional configuration of a generation unit according to the first embodiment;

FIG. 11 is a flowchart of representative vector generation processing by the generation unit according to the first embodiment;

FIG. 12 is a view showing the determination result of each class in a case where threshold NA=9.0 according to the first embodiment;

FIG. 13 is a view showing the determination result of each class in a case where threshold NB=3.0 according to the first embodiment;

FIG. 16 is a flowchart for explaining the procedure of image processing according to the first embodiment;

FIG. 17 is a view displaying images corresponding to the class number $C_1$ in FIG. 6 according to a modification;

FIG. 18 is a view displaying images corresponding to the class number $C_1$ in FIG. 6 according to the modification;

DESCRIPTION OF THE EMBODIMENTS

Figure 1:
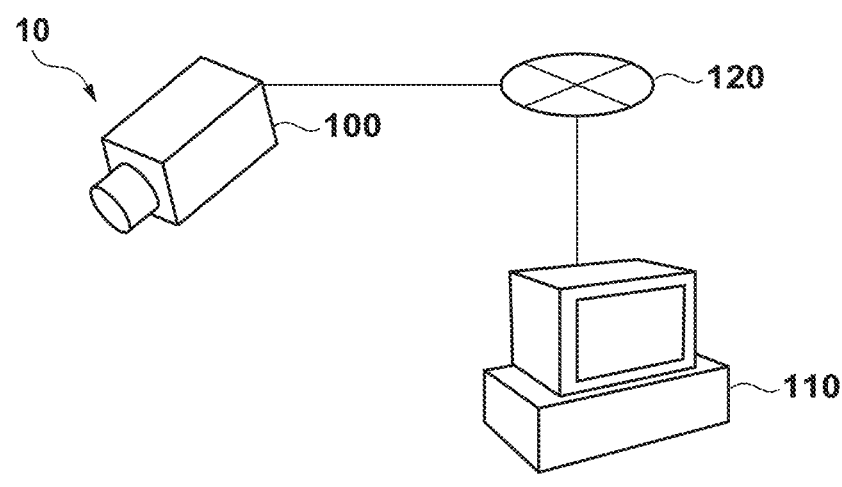
FIG. 1 is a view showing an example of the configuration of an image processing system according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

According to the present invention, it is possible to improve the classification accuracy of an object in an image.

First Embodiment

An image processing apparatus generates, on a class basis, the feature of an image group belonging to a class based on classification information that classifies each of a plurality of images to one of a plurality of classes in accordance with an object contained in each image. The image processing apparatus determines, using the feature of each class, a possibility that an image group belonging to a class includes an image with an object different from an object corresponding to the class.

Note that this embodiment may be used as an image processing system that combines an image capturing apparatus and an image processing apparatus.

FIG. 1 is a view showing an example of the configuration of an image processing system according to the first embodiment. An image processing system 10 includes an image capturing apparatus 100, an image processing apparatus 110, and a network 120.

The image capturing apparatus 100 is a camera that captures an object, and is, for example, a digital camera or a network camera. The image capturing apparatus 100 is one camera, but may be formed by two or more cameras.

The image processing apparatus 110 is an apparatus that detects a class including an image not containing a specific person from classes, and is, for example, a desktop computer or a laptop computer.

The network 120 connects the image capturing apparatus 100 and the image processing apparatus 110. The network 120 is, for example, a wired LAN or a wireless LAN.

Figure 2:
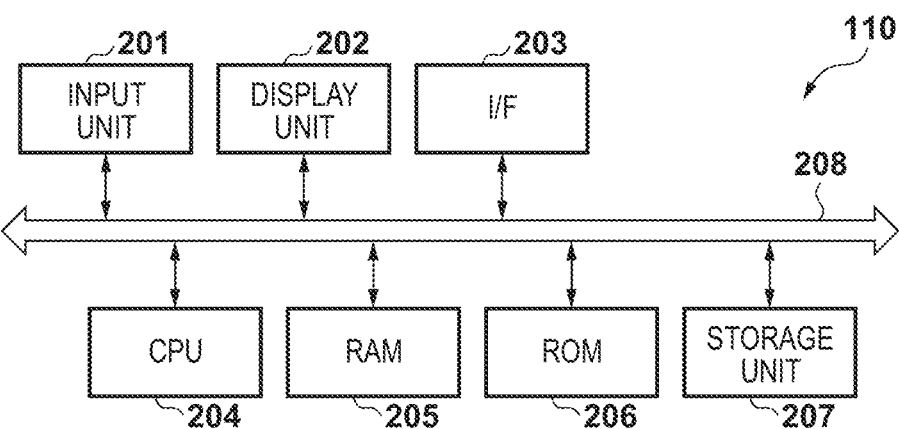
FIG. 2 is a view showing an example of the hardware configuration of an image processing apparatus according to the first embodiment.

FIG. 2 is a block diagram showing an example of the hardware configuration of the image processing apparatus according to the first embodiment.

The image processing apparatus 110 includes an input unit 201, a display unit 202, an I/F 203, a CPU 204, a RAM 205, a ROM 206, a storage unit 207, and a data bus 208.

The input unit 201 is a device by which a user inputs various kinds of data, and includes, for example, a keyboard, a mouse, a touch panel, and the like.

The display unit 202 is a device that displays various kinds of data, and includes, for example, a Liquid Crystal Display (LCD).

The I/F 203 performs transmission/reception of various kinds of information between the image processing apparatus 110 and another apparatus (not shown) via the network 120 such as the Internet.

The CPU 204 is a processor that comprehensively controls the units in the image processing apparatus 110. The CPU 204 reads out a control program from the ROM 206, loads it into the RAM 205, and executes the program, thereby performing various kinds of control. When the CPU 204 executes an image processing program in the ROM 206 or the storage unit 207, image processing for image data is implemented.

The RAM 205 is a temporary storage area for programs executed by the CPU 204 and a work memory.

The ROM 206 stores a control program configured to control the units in the image processing apparatus 110.

The storage unit 207 is a device that stores various kinds of data, and stores, for example, image data, setting parameters, and various kinds of programs. The storage unit 207 can also store data from an external device (not shown) via the I/F 203.

The data bus 208 is a transmission path configured to transmit data, and transmits image data or the like received from an external device via the I/F 203 to the CPU 204, the RAM 205, and the ROM 206. Also, the data bus 208 transmits image data and the like from the image processing apparatus 110 to the external device.

Figure 3:
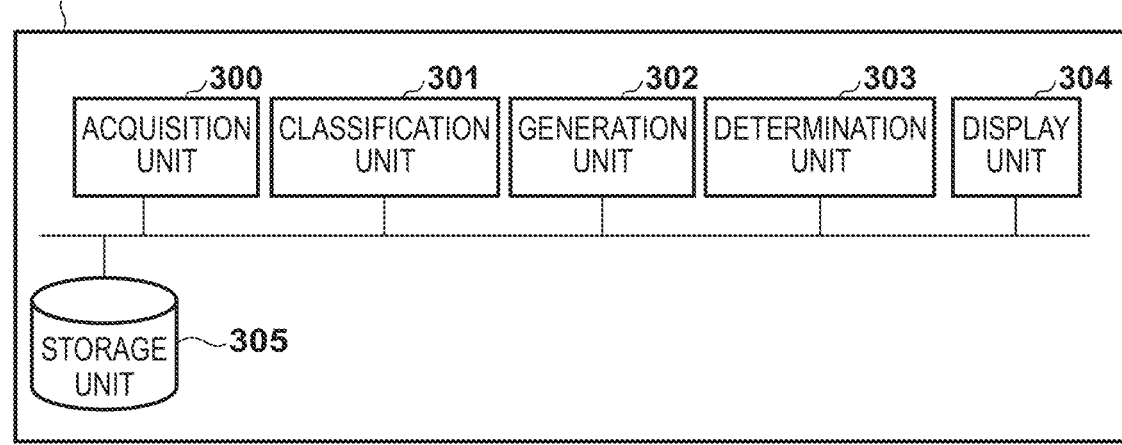
FIG. 3 is a block diagram showing an example of the functional configuration of the image processing apparatus according to the first embodiment.

FIG. 3 is a block diagram showing an example of the functional configuration of the image processing apparatus according to the first embodiment.

The image processing apparatus 110 includes an acquisition unit 300, a classification unit 301, a generation unit 302, a determination unit 303, a display unit 304, and a storage unit 305. Since all units of the image processing apparatus 110 are connected via a network, the units of the image processing apparatus 110 can transmit/receive data to/from each other.

The acquisition unit 300 stores, in the storage unit 305, an image group acquired from an external device (for example, the storage unit 207). Here, the image group means a plurality of images containing a specific person.

The classification unit 301 performs class classification of the image group acquired from the storage unit 305. Also, the classification unit 301 stores the class classification results of the image group in the storage unit 305.

The generation unit 302 generates a representative vector representing the representative feature of each class based on the image group acquired from the storage unit 305 and the class classification results of the image group. In addition, the generation unit 302 stores the representative vector in the storage unit 305.

Based on the representative vector acquired from the storage unit 305, the determination unit 303 determines whether each class is a class including an image that does not contain the specific person. Also, the determination unit 303 stores the determination result of each class in the storage unit 305.

Based on the determination result of each class in the storage unit 305, the display unit 304 displays, on the display unit 202, a class including an image that does not contain the specific person.

Figure 4:
FIG. 4 is a view showing an example of an image group according to the first embodiment.

FIG. 4 is a view showing an example of an image group according to the first embodiment.

An image group 400 includes the images of the faces of a plurality of persons captured by the image capturing apparatus 100 (for example, a digital camera). The image group 400 includes the face images of six persons. Note that the image group 400 may include the face images of five or less persons or the face images of seven or more persons.

Figure 5:
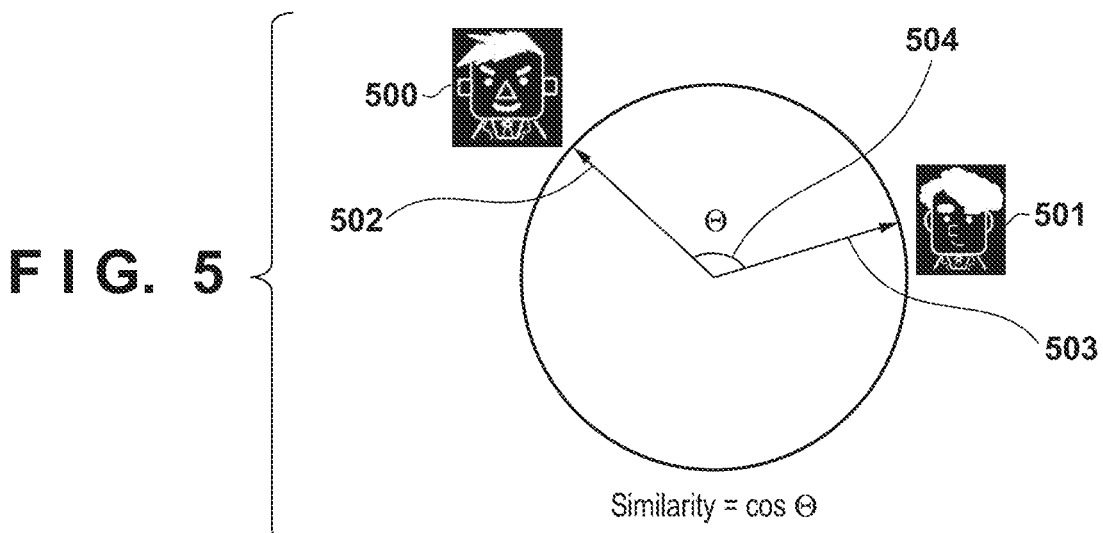
FIG. 5 is a view for explaining a similarity obtained based on the features of two images according to the first embodiment.

FIG. 5 is a view for explaining a similarity obtained based on the features of two images.

FIG. 5 shows a feature 502 extracted from an image 500 and a feature 503 extracted from an image 501. The generation unit 302 calculates the similarity (cosine similarity) between the features based on an angle 504 that the vector of the feature 502 and the vector of the feature 503 make. Here, the angle 504 is a cosine ($\cos \theta$) value. The similarity is an index representing a similarity concerning how much the two feature vectors are similar, and is represented by a numerical value within the range of $-1$ to $1$. (1) If the similarity is $-1$ (the angle 504 is 180°), the two feature vectors have a dissimilar relationship. (2) If the similarity is 0 (the angle 504 is 90°), the two feature vectors have neither a similar relationship nor a dissimilar relationship. (3) If the similarity is 1 (the angle 504 is 0°), the two feature vectors have a similar relationship.

Next, based on the similarity, the classification unit 301 decides the number of classes and the classes to which the image 500 and the image 501 belong, respectively. Without setting the number of classes in advance, the classification unit 301 decides the number of classes and the classes to which the image 500 and the image 501 belong, respectively.

Figure 6:
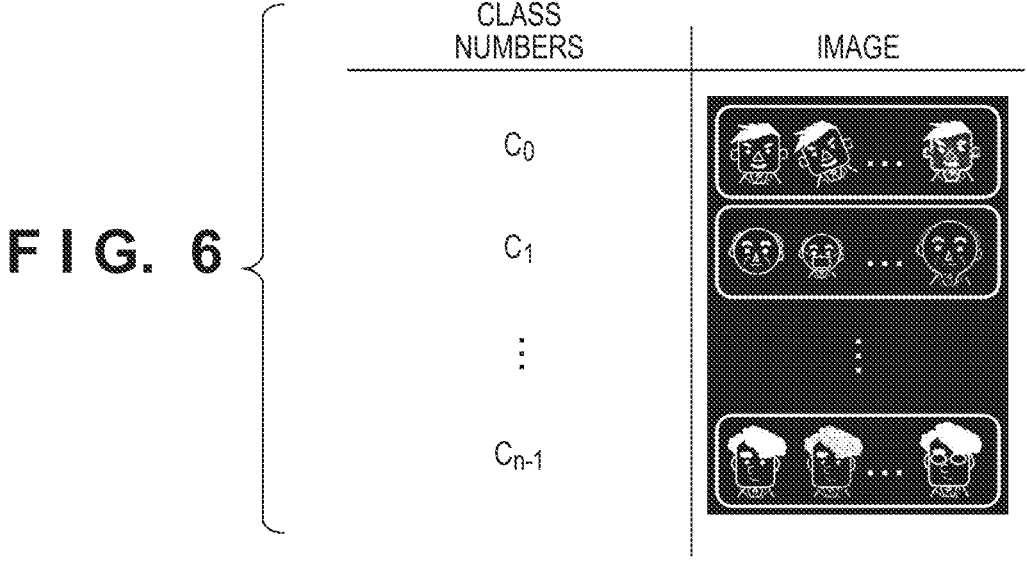
FIG. 6 is a view showing a result of classifying an image group 400 into n classes according to the first embodiment.

FIG. 6 is a view showing a result of classifying the image group 400 into n classes.

Class numbers are classification numbers of the image group 400 classified into n classes, and include $C_0$, $C_1$, and $C_{n-1}$. Each image group corresponds to one class number.

FIG. 7 shows an example of the determination result of each class.

Based on the class classification results of the image group, the classification unit 301 determines whether each class is a class including an image that does not contain a specific person. For example, if the image group corresponding to the class number $C_0$ includes one image, the classification unit 301 determines that the class number $C_0$ indicates a class including an image containing the specific person.

Also, if the image group corresponding to the class number $C_0$ includes two or more images, the classification unit 301 calculates the similarity between the features of two arbitrary images selected from the image group, and selects a smallest similarity M in the calculated similarities of all features. Then, based on whether the smallest similarity M is smaller than a predetermined threshold m, the classification unit 301 determines whether the class number $C_0$ indicates a class including an image that does not contain the specific person.

Here, it is assumed that threshold m=0. If the smallest similarity M (=−0.5) of the class number $C_0$ is smaller than threshold m=0, the classification unit 301 determines that the class number $C_0$ indicates a class including an image that does not contain the specific person. If the smallest similarity M (=+0.2) of the class number $C_1$ is not smaller than threshold m=0, the classification unit 301 determines that the class number $C_1$ indicates a class including only images containing the specific person.

Furthermore, if the smallest similarity M (=+0.1) of the class number $C_{n-1}$ is not smaller than threshold m=0, the classification unit 301 determines that the class number $C_{n-1}$ indicates a class including an image containing the specific person. The determination result of each class is represented by "YES" or "NO" in the column of "noise candidate?". Here, a noise candidate indicates a class including an image that does not contain the specific person. "YES" represents that it is a class including only images containing the specific person. "NO" represents that it is a class including an image that does not contain the specific person. The classification unit 301 can thus judge, based on the similarity between features of images included in each class, whether each class is a class including an image that does not contain the specific person. On the other hand, the determination unit 303 can determine, by another processing, whether each class is a class including an image that does not contain the specific person. Details of the processing performed by the determination unit 303 will be described later.

FIG. 8 is a view showing an example of a screen that displays the image group of the class number $C_0$.

The display unit 202 includes a user interface (UI). A screen 800 is a screen displayed on the user interface (UI). The screen 800 includes a screen 801, a button 802, a button 803, and a button 804. On the screen 800, a message "the following class is extracted as a noise candidate" is displayed.

The user views the screen 801 on which the image group of the class number $C_0$ extracted as a noise candidate is shown, and selects one of the buttons 802 to 804.

If the button 802 or the button 803 is pressed by the user, the display unit 304 registers the class on the screen 801 as a class including noise or a class that does not include noise. Noise indicates an image that does not contain a specific person. The display unit 304 stores the registration information of the class number $C_0$ in the storage unit 207.

If the button 804 is pressed by the user, the display unit 304 performs detailed analysis processing of the image group on the screen 801.

Figure 9:
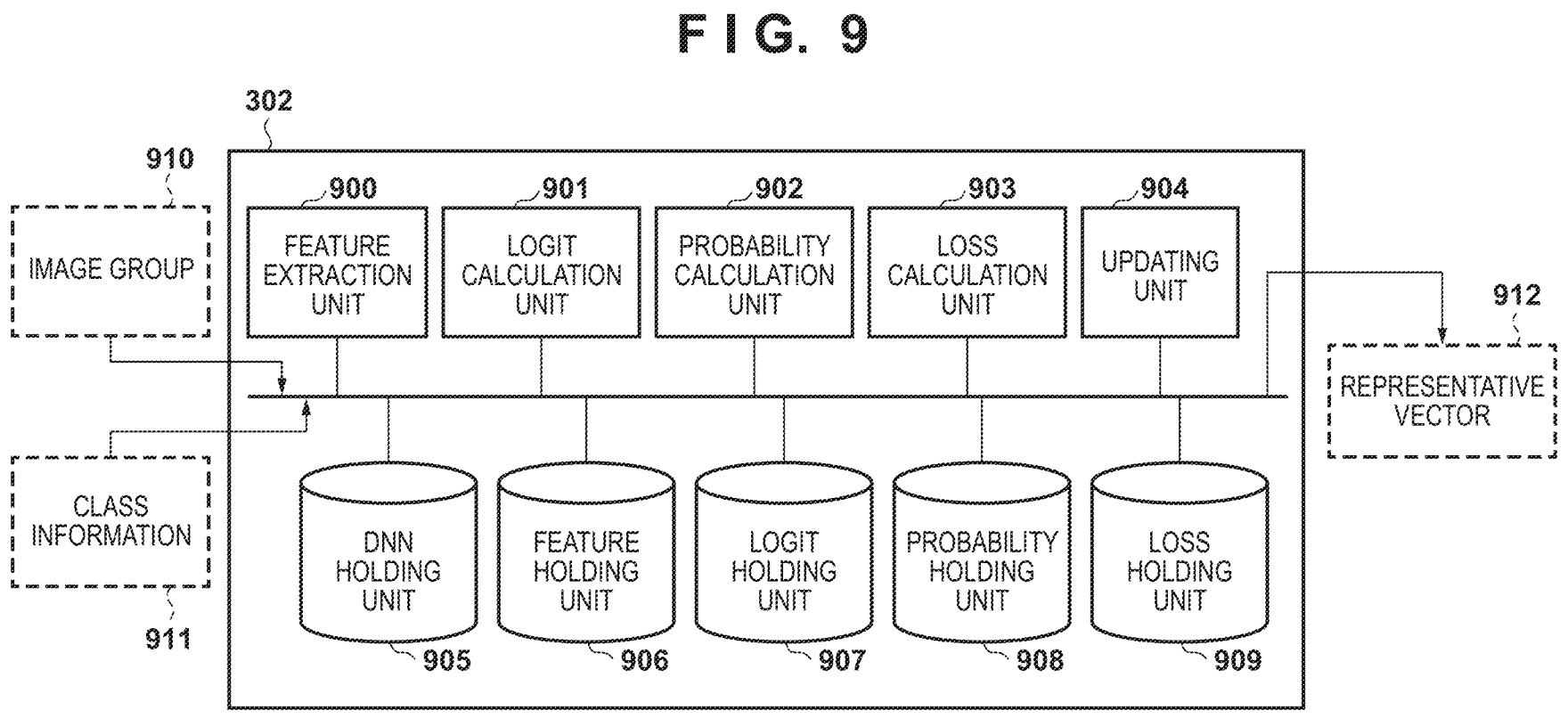

FIG. 9 is a block diagram showing an example of the functional configuration of the generation unit.

The generation unit 302 includes a feature extraction unit 900, a logit calculation unit 901, a probability calculation unit 902, a loss calculation unit 903, an updating unit 904, and a DNN holding unit 905. The generation unit 302 further includes a feature holding unit 906, a logit holding unit 907, a probability holding unit 908, and a loss holding unit 909.

All units of the generation unit 302 are connected via a network, and these can transmit/receive data to/from each other. Also, the generation unit 302 processes an image group 910 acquired from an external device (the storage unit 207 or the like) and class information 911 to which the image group 910 belongs. Thus, the generation unit 302 generates a representative vector 912 representing the feature of the class information 911, and outputs the representative vector 912 to the external device.

The feature extraction unit 900 acquires a DNN from the DNN holding unit 905, and acquires the image group 910 from the external device (for example, the storage unit 207). Also, the feature extraction unit 900 stores, in the feature holding unit 906, a feature extracted from the image group 910 using the DNN.

The logit calculation unit 901 acquires the feature of the image group 910 from the feature holding unit 906, and acquires the DNN from the DNN holding unit 905. Also, the logit calculation unit 901 stores, in the logit holding unit 907, a logit calculated from the feature of the image group 910 using the DNN.

The probability calculation unit 902 calculates a personal probability using the logit acquired from the logit holding unit 907. Also, the probability calculation unit 902 stores the personal probability in the probability holding unit 908.

The loss calculation unit 903 calculates a loss using the personal probability acquired from the probability holding unit 908. Also, the loss calculation unit 903 stores the calculated loss in the loss holding unit 909.

The updating unit 904 acquires the loss from the loss holding unit 909, and acquires the DNN from the DNN holding unit 905. Also, the updating unit 904 updates parameters held by the DNN based on the loss.

Figure 20:
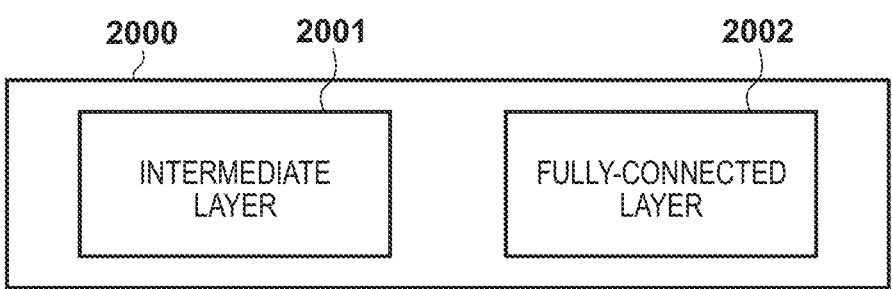
FIG. 20 is a view showing an example of the configuration of a DNN held by a DNN holding unit.

The configuration of the DNN will be described here. FIG. 20 is a view for explaining an example of the configuration of the DNN held by the DNN holding unit.

A DNN 2000 includes an intermediate layer 2001 and a fully-connected layer 2002. The DNN 2000 includes an intermediate layer and a fully-connected layer of a Residual network, but may include another intermediate layer and another fully-connected layer.

The intermediate layer 2001 includes a convolution layer and a pooling layer configured to extract a feature from image data. The convolution layer holds parameters to be updated by the updating unit 904 shown in FIG. 9.

The fully-connected layer 2002 has parameters used to calculate a logit from the feature of the image data. The parameters are parameters to be updated by the updating unit 904, like the parameters held by the convolution layer of the intermediate layer 2001.

Figure 21:
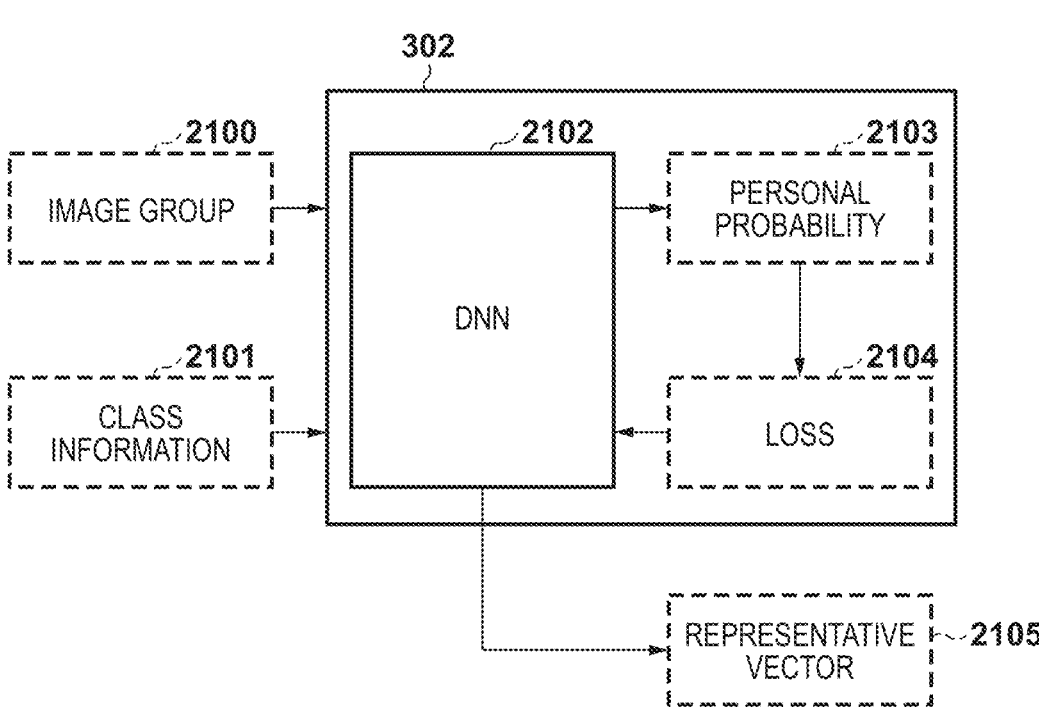
FIG. 21 is a schematic view of representative vector generation processing by the generation unit.

FIG. 21 is a schematic view of representative vector generation processing by the generation unit.

The generation unit 302 includes a DNN 2102, and acquires an image group 2100 and class information 2101 from an external device (for example, the storage unit 207).

First, the generation unit 302 processes the image group 2100 and the class information 2101 using the DNN 2102, thereby calculating a personal probability 2103 of each image belonging to the image group 2100.

Next, the generation unit 302 compares the class information 2101 with the personal probability 2103, thereby calculating a loss 2104.

Furthermore, the generation unit 302 updates the parameters held by the DNN 2102 using the loss 2104. The generation unit 302 repetitively performs the calculation of the personal probability 2103, the calculation of the loss 2104, and the updating of the parameters held by the DNN 2102 until the value of the loss 2104 satisfies a predetermined condition.

After the updating of the parameters is ended, the generation unit 302 outputs some of the parameters held by the DNN 2102 to the outside as representative vectors.

Figure 10:
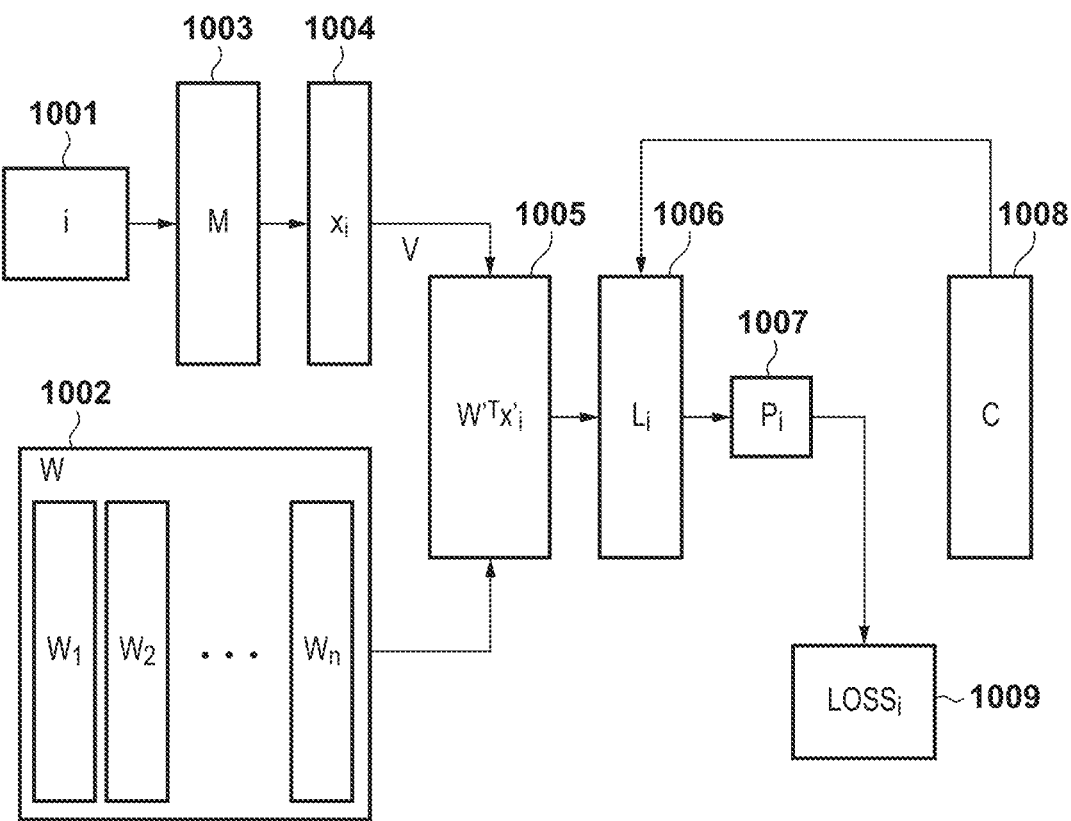
FIG. 10 is a view showing details of representative vector generation processing by the generation unit according to the first embodiment.

FIG. 10 is a view showing details of representative vector generation processing by the generation unit. FIG. 10 shows an image 1001, a fully-connected layer 1002, an intermediate layer 1003, a feature vector 1004, an n-dimensional vector 1005, an n-dimensional vector 1006, a personal probability 1007, class information 1008, and a loss 1009.

FIG. 11 is a flowchart of representative vector generation processing by the generation unit. The processing shown in FIG. 11 will be described below with reference to FIGS. 9 and 10.

In step S1100, the feature extraction unit 900 initializes the parameters of the fully-connected layer 1002 and the intermediate layer 1003. The fully-connected layer 1002 is a matrix including 512 rows, which are as many as the number of dimensions of the feature vector 1004, and n columns. The parameters of the fully-connected layer 1002 are the elements of the matrix. The feature extraction unit 900 initializes each element of the matrix of the fully-connected layer 1002 using a random number from 0 to 1. The parameter of the intermediate layer 1003 is the weight coefficient of the convolution layer included in the intermediate layer 1003. The feature extraction unit 900 initializes the weight coefficient of the intermediate layer 1003 using a random number from 0 to 1.

In step S1101, the feature extraction unit 900 extracts a feature from the image 1001 using the intermediate layer 1003, and acquires the 512-dimensional feature vector 1004.

In step S1102, the logit calculation unit 901 calculates the n-dimensional vector 1006 formed from n logits. First, the logit calculation unit 901 calculates the n-dimensional vector 1005 using equation (1) below. The n-dimensional vector is represented by V.

$$V = W'^T x'_i \tag{1}$$

Here, $W'^T$ is a matrix obtained by normalizing column vectors $w_1, w_2, \ldots, w_n$ in a matrix W such that the vector length of each vector becomes 1. Also, $x'_i$ is a vector obtained by normalizing a 512-dimensional feature vector x such that its vector length becomes 1. For this reason, letting θ be the angle made by two vectors, the inner product value of $w_k$ (k=1, 2, . . . n) and $x'_i$ is cos θ. Hence, equation (1) can be rewritten to $$W'^T x'_i = \begin{pmatrix} w'_1 x'_i \\ w'_2 x'_i \\ \vdots \\ w'_n x'_i \end{pmatrix} = \begin{pmatrix} |w'_1||x'_i|\cos\theta_1 \\ |w'_2||x'_i|\cos\theta_2 \\ \vdots \\ |w'_n||x'_i|\cos\theta_n \end{pmatrix} = \begin{pmatrix} \cos\theta_1 \\ \cos\theta_2 \\ \vdots \\ \cos\theta_n \end{pmatrix} \tag{2}$$

Next, the logit calculation unit 901 calculates the n-dimensional vector 1006 formed from n logits using the n-dimensional vector 1005 and the class information 1008. Here, the class information 1008 is the class number of the class to which an image i currently under processing belongs. More specifically, the logit calculation unit 901 calculates each logit in the n-dimensional vector 1006 by $$L_i = \begin{pmatrix} s \cdot \cos\theta_1 \\ s \cdot \cos\theta_2 \\ \vdots \\ s \cdot \cos(\theta_k + m) \\ \vdots \\ s \cdot \cos\theta_n \end{pmatrix} \tag{3}$$

In equation (3), s is the parameter of a scalar value experimentally set by the user. For example, s=32, but s may be another numerical value. k is the class number of the class to which the image i belongs, and is, for example, a numerical value from 1 to n. Also, m is the parameter of a scalar value experimentally set by the user. For example, m=0.5, but m may be another numerical value.

In step S1103, the probability calculation unit 902 calculates the personal probability 1007. Here, the personal probability indicates a value obtained by calculating, using the n-dimensional vector 1006 indicated by equation (3), the probability that the image i belongs to a class C_k. More specifically, the probability calculation unit 902 calculates a personal probability Pi using $$p_i = \frac{\exp(s \cdot \cos(\theta_k + m))}{\exp(s \cdot \cos(\theta_k + m)) + \sum_{c \neq k} \exp(s \cdot \cos(\theta_c))} \tag{4}$$

In step S1104, the loss calculation unit 903 calculates the loss 1009. Here, the loss calculation unit 903 calculates the losses of all images prepared in advance and calculates the loss 1009 by averaging the calculated losses. First, letting LOSS_i be the loss of the image i, the loss calculation unit 903 calculates LOSS_i by $$\text{LOSS}_i = \log(p_i) \tag{5}$$

Hence, if the number of images prepared in advance is N, the loss calculation unit 903 calculates LOSS by $$\text{LOSS} = \frac{1}{N} \sum_i \text{LOSS}_i \tag{6}$$

In step S1105, the updating unit 904 determines whether the loss converges. If the updating unit 904 determines that the loss does not converge (NO in step S1105), the process advances to step S1106. On the other hand, if the updating unit 904 determines that the loss converges (YES in step S1105), the process advances to step S1107.

For example, if the determination count of convergence of the loss in step S1105 is 1, the updating unit 904 determines that the loss does not converge.

If the determination count of convergence of the loss in step S1105 is 2 or more, and the magnitude of the loss calculated in step S1104 is larger than the magnitude of the previously calculated loss, the updating unit 904 determines that the loss converges.

On the other hand, if the magnitude of the loss is smaller than the magnitude of the previously calculated loss, the updating unit 904 determines that the loss does not converge.

However, the method of determining whether the loss converges is not limited to the above-described method, and a method of performing the determination based on the ratio of the magnitude of the current loss to the magnitude of the previous loss may be used. Alternatively, the method of determining whether the loss converges may be a method of performing the determination depending on whether the magnitude of the loss is smaller than an experimentally determined threshold, or may be a method other than those described above.

In step S1106, the updating unit 904 updates the parameters of the fully-connected layer 1002 and the intermediate layer 1003, and the process returns to step S1101.

For example, the updating unit 904 sets a learning rate $\varepsilon$ to, for example, $\varepsilon=0.01$. Next, using the loss 1009 obtained by equation (6), the updating unit 904 updates the parameters of the fully-connected layer 1002 and the intermediate layer 1003 by back propagation.

In step S1107, the updating unit 904 calculates a representative vector corresponding to each class, and the processing is ended. More specifically, the updating unit 904 extracts data in the matrix W of the fully-connected layer 1002 on a column basis, and obtains the vector of a kth column as the representative vector of the class whose class number is k. For the column vectors $w_1, w_2, \ldots, w_n$ in the matrix W of the fully-connected layer 1002, the updating unit 904 obtains $w_1$ as the representative vector of the class whose class number is 1, and $w_2$ as the representative vector of the class whose class number is 2. Thus, the generation unit 302 can generate a representative vector corresponding to each class.

In this embodiment, based on the calculated representative vector representing the feature of each class, it is determined whether the class is a class including an image that does not contain a specific person. The determination unit 303 determines each class by the following three methods.

Method A: a class for which the norm of the representative vector is large is determined as a noise candidate.

Method B: a class for which the norm of the representative vector is small is determined as a noise candidate.

Method C: a pair of classes for which the similarity between the representative vectors is large is determined as a noise candidate.

(Method A)

FIG. 12 is a view showing the determination result of each class in a case where threshold NA=9.0.

As a result of updating the parameters such that the loss becomes small, in a class (for example, $C_0$) for which the norm of the representative vector is large, the variation of the features of images is large. If the variation of the features of images is large, there is a possibility that an image containing a person different from the specific person may exist in the class. Hence, to detect a class (noise candidate) including an image containing two or more other persons, the determination unit 303 determines a class for which the norm of the representative vector is large as a noise candidate.

First, the determination unit 303 calculates the L2 norm of a representative vector corresponding to each class number. Next, based on whether the L2 norm of each class is equal to or larger than a predetermined threshold NA, the determination unit 303 determines whether each class is a noise candidate. Here, the threshold NA is 9.0. The determination result of each class is represented by "YES" or "NO" in the column of "noise candidate?". Here, a noise candidate indicates a class including an image that does not contain the specific person. "YES" represents that it is a class including an image containing the specific person. "NO" represents that it is a class including an image that does not contain the specific person.

More specifically, if the L2 norm (=10.5) of the representative vector of the class number $C_0$ is equal to or larger than the threshold NA (=9.0), the determination unit 303 determines that the class number $C_0$ is a noise candidate. Also, if the L2 norm (=9.8) of the representative vector of the class number $C_1$ is equal to or larger than the threshold NA (=9.0), the determination unit 303 determines that the class number $C_1$ is a noise candidate. Furthermore, if the L2 norm (=1.9) of the representative vector of a class number $C_k$ is not equal to or larger than the threshold NA (=9.0), the determination unit 303 determines that the class number $C_k$ is not a noise candidate. Finally, if the L2 norm (=2.2) of the representative vector of the class number $C_{n-1}$ is not equal to or larger than the threshold NA (=9.0), the determination unit 303 determines that the class number $C_{n-1}$ is not a noise candidate.

(Method B)

FIG. 13 is a view showing the determination result of each class in a case where threshold NB=3.0.

As a result of updating the parameters such that the loss becomes small, in a class (for example, $C_k$) for which the norm of the representative vector is small, the variation of the features of images is small. If the variation of the features of images is small, the features of images have poor diversity. For this reason, there is a possibility that a face image of a doll or a stone statue without an expression change exists in the class for which the norm of the representative vector is small. Hence, to detect a class including a face image other than that of a person (for example, the face of a doll or the face of a stone statue), the determination unit 303 determines a class for which the norm of the representative vector is small as a noise candidate.

First, the determination unit 303 calculates the L2 norm of a representative vector corresponding to each class number. Next, based on whether the L2 norm of each class is equal to or smaller than a predetermined threshold NB, the determination unit 303 determines whether each class is a noise candidate. Here, the threshold NB is 3.0. The determination result of each class is represented by "YES" or "NO" in the column of "noise candidate?". Here, a noise candidate indicates a class including an image that does not contain the specific person. "YES" represents that it is a class including an image containing the specific person. "NO" represents that it is a class including an image that does not contain the specific person.

More specifically, if the L2 norm (=10.5) of the representative vector of the class number $C_0$ is not equal to or smaller than the threshold NB (=3.0), the determination unit 303 determines that the class number $C_0$ is not a noise candidate. Also, if the L2 norm (=9.8) of the representative vector of the class number $C_1$ is not equal to or smaller than the threshold NB (=3.0), the determination unit 303 determines that the class number $C_1$ is not a noise candidate. Furthermore, if the L2 norm (=1.9) of the representative vector of the class number $C_k$ is equal to or smaller than the threshold NB (=3.0), the determination unit 303 determines that the class number $C_k$ is a noise candidate. Finally, if the L2 norm (=2.2) of the representative vector of the class number $C_{n-1}$ is equal to or smaller than the threshold NB (=3.0), the determination unit 303 determines that the class number $C_{n-1}$ is a noise candidate.
(Method C)

Figures 14, 15:
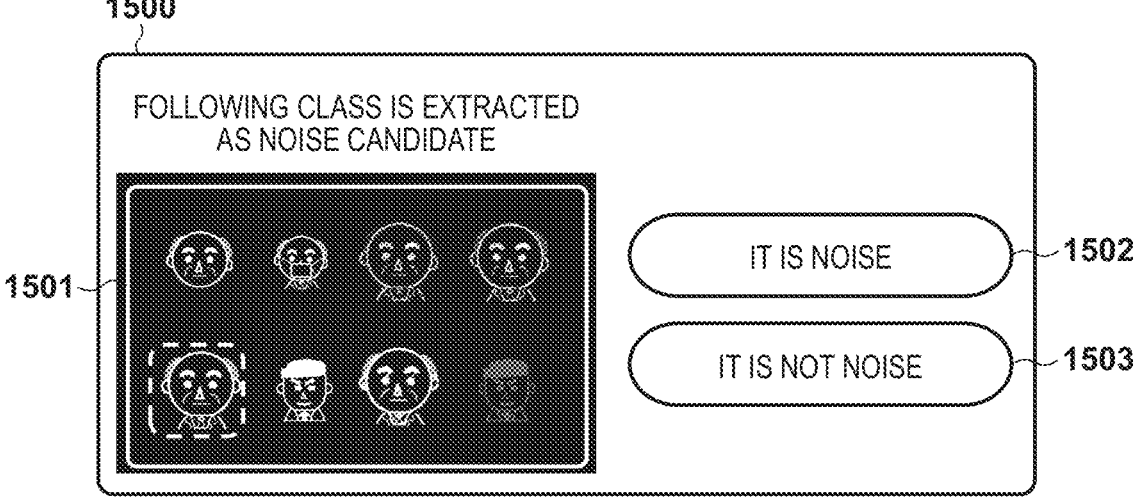
FIG. 14 is a view showing the determination result of each class in a case where threshold SC=0.7 according to the first embodiment.
FIG. 15 is a view displaying images corresponding to a class number $C_1$ in FIG. 6 according to the first embodiment.

FIG. 14 is a view showing the determination result of each class in a case where threshold SC=0.7.

To detect a class in which an image containing a specific person exists from two or more classes different from each other, the determination unit 303 determines a pair of two classes as a noise candidate based on whether the similarity between the representative vectors of the two classes is equal to or larger than a threshold.

First, the determination unit 303 calculates the L2 norm of the representative vector of each class. Next, the determination unit 303 determines two classes as noise candidates based on whether the similarity between the representative vectors of the two classes is equal to or larger than the predetermined threshold SC. Here, the determination unit 303 calculates the similarity between the representative vectors of the two classes as the cosine value of the angle made by the two representative vectors. Here, the threshold SC is 0.7. The determination result of each class is represented by "YES" or "NO" in the column of "noise candidate?". Here, a noise candidate indicates a class including an image that does not contain the specific person. "YES" represents that it is a class including an image containing the specific person. "NO" represents that it is a class including an image that does not contain the specific person.

More specifically, if the similarity (=−0.8) of a pair ($C_0$, $C_1$) of class numbers is not equal to or larger than the threshold SC (=0.7), the determination unit 303 determines that the pair ($C_0$, $C_1$) of class numbers is not a noise candidate. Also, if the similarity (=−0.8) of a pair ($C_{m-2}$, $C_{m-1}$) of class numbers is equal to or larger than the threshold SC (=0.7), the determination unit 303 determines that the pair ($C_{m-2}$, $C_{m-1}$) of class numbers is a noise candidate. Furthermore, if the similarity (=−0.6) of a pair ($C_{n-2}$, $C_{n-1}$) of class numbers is not equal to or larger than the threshold SC (=0.7), the determination unit 303 determines that the pair ($C_{n-2}$, $C_{n-1}$) of class numbers is not a noise candidate.

FIG. 15 is a view displaying images corresponding to the class number $C_1$ in FIG. 6.

Based on the determination result of each class, the display unit 304 displays, on the screen of the display unit 202, images belonging to a class that is a noise candidate. The user confirms the images displayed on the screen of the display unit 304, and performs various kinds of inputs.

A screen 1500 is a user interface displayed on the display unit 202. The screen 1500 includes a button 1502 and a button 1503. The user views an image group 1501 belonging to the class that is a noise candidate, and selects the button 1502 or the button 1503.

If the button 1502 is pressed by the user, the display unit 304 registers that the displayed class (here, the class number $C_1$) is a class including images that do not contain a specific person. The display unit 304 registers the registration information in the storage unit 207.

If the button 1503 is pressed by the user, the display unit 304 registers that the displayed class (here, the class number $C_1$) is not a class including images that do not contain the specific person. The display unit 304 registers the registration information in the storage unit 207.

FIG. 16 is a flowchart for explaining an example of image processing according to the first embodiment. The procedure of image processing shown in FIG. 16 will be described with reference to FIGS. 2 to 15.

In step S1600, the acquisition unit 300 collects images from the storage unit 207 or the like.

In step S1601, the classification unit 301 performs class classification of the collected image group 400 using a DNN.

In step S1602, the determination unit 303 determines, based on the class classification result of the image group 400, whether each class is a noise candidate. In step 1603, based on the class classification result, the determination unit 303 displays, on the display unit 202, images belonging to a class that is a noise candidate.

In step S1604, the display unit 304 displays, on the user interface, a message asking whether to execute detailed analysis to improve the estimation accuracy of the class that is a noise candidate. If the display unit 304 determines not to perform additional work to the class that is a noise candidate (NO in step S1604), the processing is ended. If the display unit 304 determines to perform additional work to the class that is a noise candidate (YES in step S1604), the process advances to step S1605.

In step S1605, the generation unit 302 calculates a representative vector representing the feature of each class based on the image group 400 and the class classification result of the image group 400.

In step S1606, the determination unit 303 determines, using the representative vector of each class, whether each class is a noise candidate.

In step S1607, based on the determination result obtained by the determination unit 303 determining whether each class is a noise candidate, the display unit 304 displays, on the display unit 202, an image group belonging to the class that is a noise candidate.

In step S1608, the user confirms the image group belonging to the noise candidate displayed on the user interface, and determines whether an image that is noise (an image that does not contain a specific person) is included in the class. After the display unit 304 accepts the input for the determination result of the class by the user, the processing is ended.

In general, when a number of images are automatically collected and clustered, the following events may occur. For example, an event that an image that does not contain a desired person is mixed in a class, an event that an image of another class is mixed in a class, or an event that images of the same object or person exist in different classes occurs. For this reason, a problem that the capacity of unnecessary data becomes enormous and a problem that an inappropriate image is printed when printing images in a class arise. Hence, candidates of a class including noise (an image that does not contain a specific person) are extracted, and the extracted candidates of the class are displayed on a user interface. Furthermore, the user confirms the image group of the class displayed on the user interface, and determines whether an image that is noise (an image that does not contain a specific person) is included in the class.

According to the first embodiment, it is possible to detect, from the classes, a class including an image that does not contain a specific object.

(Modification)

In the first embodiment, the user determines whether the class displayed on the screen (shown in FIG. 15) is a class including noise (an image that does not contain a specific person) and presses the button 1502 or the button 1503. In this determination method, the noise determination for a class is performed only on a class basis. However, a class sometimes includes an image that does not include noise (that is, an image containing a specific person) and an image including noise (that is, an image that does not contain a specific person). Hence, the user may further determine whether each image in a class is an image including noise. More specifically, using user interfaces (shown in FIGS. 17 and 18), the user determines whether each image in a class is noise, and selects, from the images, an image including noise.

FIG. 17 is a view displaying images corresponding to the class number $C_1$ in FIG. 6.

A screen 1700 is a user interface displayed on the display unit 202. The screen 1700 includes a button 1702, a button 1703, and a button 1704. The user views an image group 1701 belonging to a class that is a noise candidate, and selects one of the buttons 1702 to 1704.

If the button 1702 is pressed by the user, the display unit 304 registers that the displayed class is a class including noise (an image that do not contain a specific person). The display unit 304 registers the registration information of the class in the storage unit 207.

If the button 1703 is pressed by the user, the display unit 304 registers that the displayed class is not a class including noise (an image that do not contain a specific person). The display unit 304 registers the registration information of the class in the storage unit 207.

If the button 1704 is pressed by the user, the display unit 304 displays a user interface shown in FIG. 18.

FIG. 18 is a view displaying images corresponding to class number $C_1$ in FIG. 6.

A screen 1800 is a user interface displayed on the display unit 202. The user views each image of an image group 1801 belonging to a class that is a noise candidate, and selects a checkbox located under an image determined as noise.

After selecting the checkbox located under the image determined as noise, the user selects a button 1802 or 1803.

If the button 1802 is pressed by the user, the display unit 304 registers that the image corresponding to the selected checkbox is an image including noise. The display unit 304 stores the registration information of the image including noise in the storage unit 207.

If the button 1803 is pressed by the user, the display unit 304 does not register that the image corresponding to the selected checkbox is an image including noise, and displays the user interface shown in FIG. 17 again.

As described above, it is possible not only to determine whether each class is a class including noise but also to determine whether each image in a class is an image including noise.

Second Embodiment

In the first embodiment, a class including noise is detected from classes obtained by classifying an image group captured by the user using an image capturing apparatus (for example, a digital camera). In the second embodiment, an image that is noise is removed from learning data of a DNN used in a system (to be referred to as a face authentication system hereinafter) configured to authenticate a person using a face image. In the second embodiment, a class that is noise is detected from classes obtained by classifying an image group collected by web crawling. It is therefore considered that the ratio of the number of images as noise included in a class is higher in the second embodiment than in the first embodiment. Hence, in the second embodiment, calculation of the representative vector of each class and removal of an image as noise from a class including noise are repeated, thereby detecting more noise from the class. Note that in the second embodiment, differences from the first embodiment will be described.

Figure 19:
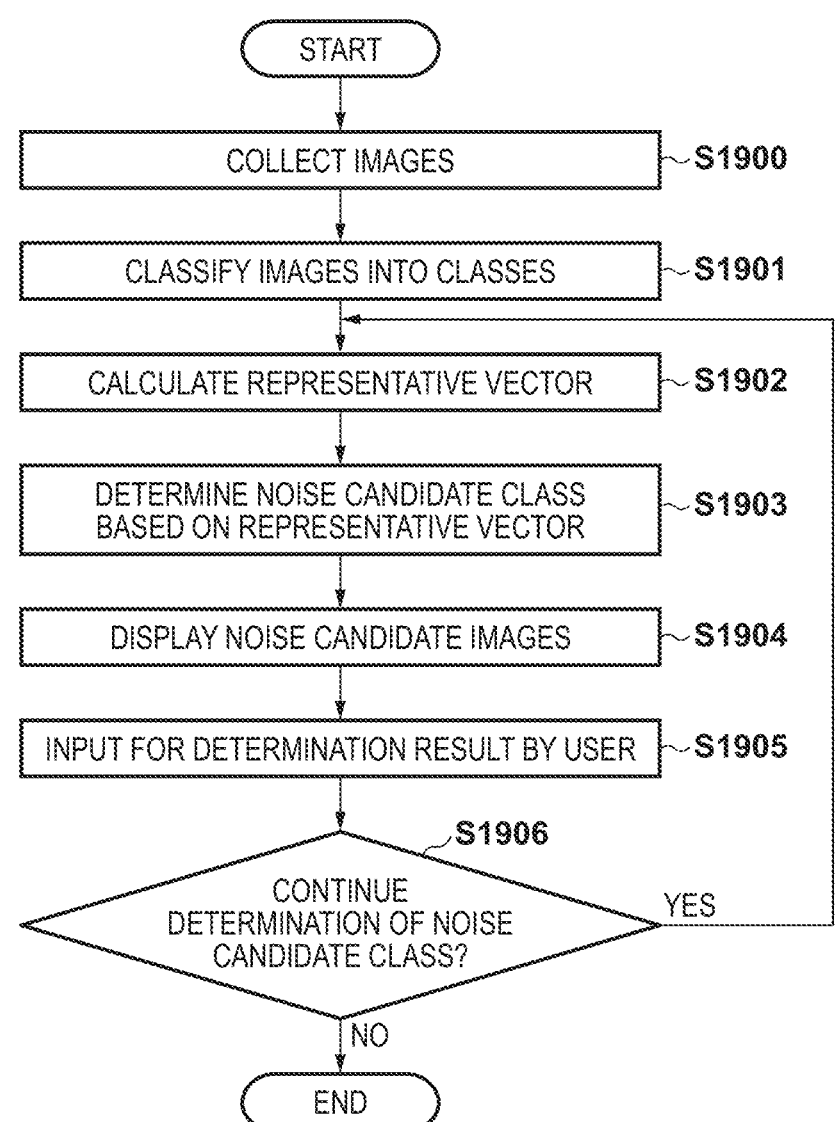
FIG. 19 is a flowchart for explaining the procedure of image processing according to the second embodiment.

FIG. 19 is a flowchart for explaining the procedure of image processing according to the second embodiment.

In step S1900, an acquisition unit 300 collects learning images of a DNN by a web crawling method. More specifically, the acquisition unit 300 creates a list of person names expressed in various languages. Next, the acquisition unit 300 performs a web search using each name described in the list, thereby collecting an image group.

In step S1901, a classification unit 301 performs class classification of the image group. The classification unit 301 classifies an image group collected by a search using one name as one class.

In step S1902, a generation unit 302 calculates the representative vector of each class.

In step S1903, a determination unit 303 determines whether each class is a class including noise (an image that does not contain a specific person).

In step S1904, a display unit 304 displays images belonging to the class candidate including noise on a display unit 202 based on the determination result of each class by the determination unit 303.

In step S1905, the user confirms the images on the user interface of the display unit 202, and inputs, to the user interface, a result of determining whether an image that is noise is included in the class candidate including noise. Note that using a user interface (shown in FIG. 18), the user may input, to the user interface, a result of determining whether each image in the class is an image including noise.

In step S1906, the display unit 304 determines, based on an instruction of the user, whether to continue the work of determining a class that is a noise candidate. If the display unit 304 determines to continue the class determination work (YES in step S1906), the process returns to step S1902. At this time, the display unit 304 removes the image determined as noise from the image group of the class. If the display unit 304 determines not to continue the class determination work (NO in step S1906), the processing is ended.

According to the second embodiment, it is possible to efficiently remove an image that is noise from each class by repeating calculation of the representative vector of each class and removal of an image in a class.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-064646, filed Apr. 8, 2022, which is hereby incorporated by reference herein in its entirety.

What is claimed is:

1. An image processing apparatus for performing class classification of an image, comprising:
at least one processor; and
a memory coupled to the at least one processor, the memory storing instructions that, when executed by the processor, cause the processor to act as:
a classification unit configured to classify each of a plurality of images into one of a plurality of classes in accordance with an object contained in each image;
a generation unit configured to generate a representative feature of each class based on an image group belonging to the class; and
a determination unit configured to determine, using a magnitude of a norm of a vector representing the representative feature of each class generated by the generation unit, a possibility that the image group belonging to the class as a noise.

2. The apparatus according to claim 1, wherein the generation unit performs learning of a model configured to estimate, from the image, classification information for the image, and generates the representative feature of the image group belonging to the class using a parameter of the model after the learning.

3. The apparatus according to claim 2, wherein
the model includes an intermediate layer that extracts, from the image, the representative feature of the image, and a fully-connected layer that estimates the classification information from the representative feature of the image, and
the generation unit generates the representative feature of the image group belonging to the class using a parameter of the fully-connected layer after the learning.

4. The apparatus according to claim 3, wherein
the model outputs a likelihood of the image belonging to each class, and
the generation unit generates the representative feature of an image group belonging to a specific class using the parameter of the fully-connected layer used to obtain the likelihood of the image belonging to the specific class.

5. The apparatus according to claim 4, wherein the model outputs the likelihood of the image belonging to the specific class based on an inner product of the representative feature of the image and the parameter of the fully-connected layer corresponding to the specific class.

6. The apparatus according to claim 4, further comprising an updating unit for updating parameters of the intermediate layer and the fully-connected layer based on a difference between the classification information and the likelihood of the image belonging to the specific class.

7. The apparatus according to claim 1, wherein the determination unit determines, based on the magnitude of the norm of the vector representing the representative feature of the image group belonging to a specific class, the possibility that the image group belonging to the specific class includes the image containing another object different from the object corresponding to the specific class.

8. The apparatus according to claim 1, wherein the determination unit determines, based on whether a similarity between a vector representing a feature of an image group of one class of the plurality of classes and a vector representing a feature of an image group of another class exceeds a threshold, a possibility that the image groups belonging to the one class and the other class include an image containing another object different from an object corresponding to the one class and the other class.

9. The apparatus according to claim 1, wherein the determination unit controls output of the image group belonging to the class determined to include the image containing the other object different from the object corresponding to the class.

10. The apparatus according to claim 1, further comprising a user interface configured to display the image group belonging to the class determined by the determination unit to include the image containing the other object different from the object corresponding to the class and accept processing to be executed for one of the class and the image group.

11. The apparatus according to claim 10, wherein the determination unit controls to output some images of the image group belonging to the class based on the processing accepted by the user interface.

12. The apparatus according to claim 10, wherein the determination unit acquires a user input for designating, in the image group displayed on the user interface, the image containing the other object different from the object corresponding to the class.

13. The apparatus according to claim 1, wherein the generation of the representative feature of the image group belonging to the class by the generation unit, the determination of the possibility by the determination unit, and the removal of the image containing the other object different from the object corresponding to the class or an image group belonging to the class determined to include the image are repetitively performed.

14. The apparatus according to claim 1, further comprising:
an acquisition unit configured to acquire the plurality of images.

15. The apparatus according to claim 1, wherein the object is a face of a person.

16. The apparatus according to claim 1, wherein the object is a person, and the plurality of classes correspond to different persons, respectively.

17. The apparatus according to claim 1, wherein the determination unit is further configured to identify the class as a noise candidate if the image group belonging to the class includes an image that contains another object different from the object corresponding to the class.

18. The apparatus according to claim 1, wherein the determination unit is further configured to identify the class as a noise candidate if the image group belonging to the class includes the image that does not contain the object corresponding to the class.

19. An image processing method comprising:

classifying each of a plurality of images into one of a plurality of classes in accordance with an object contained in each image;

generating a representative feature of each class based on an image group belonging to the class; and determining, using a magnitude of a norm of a vector representing the representative feature of each class generated in the generating, a possibility that the image group belonging to the class as a noise.

20. A non-transitory computer-readable storage medium storing instructions that, when executed by a computer, cause the computer to perform an image processing method comprising:

classifying each of a plurality of images into one of a plurality of classes in accordance with an object contained in each image;

generating a representative feature of each class based on an image group belonging to the class; and determining, using a magnitude of a norm of a vector representing the representative feature of each class generated in the generating, a possibility that the image group belonging to the class as a noise.

\* \* \* \* \*